(12) United States Patent
Swiler et al.

(10) Patent No.: US 7,013,395 B1
(45) Date of Patent: Mar. 14, 2006

(54) METHOD AND TOOL FOR NETWORK VULNERABILITY ANALYSIS

(75) Inventors: Laura Painton Swiler, Albuquerque, NM (US); Cynthia A. Phillips, Albuquerque, NM (US)

(73) Assignee: Sandra Corporation, Albuquerque, NM (US)

(*) Notice: Subject to any disclaimer, the term of this patent is extended or adjusted under 35 U.S.C. 154(b) by 829 days.

(21) Appl. No.: 09/805,640

(22) Filed: Mar. 13, 2001

(51) Int. Cl.
*H04L 9/00* (2006.01)
*G06F 11/30* (2006.01)

(52) U.S. Cl. .................. 713/201; 713/151; 713/152; 713/153; 713/188

(58) Field of Classification Search .............. 713/201, 713/200, 151–153, 188; 370/341–430; 709/238–244, 709/225; 705/79; 714/38
See application file for complete search history.

(56) References Cited

U.S. PATENT DOCUMENTS

| | | | | |
|---|---|---|---|---|
| 4,009,346 A | * | 2/1977 | Parker et al. ............. | 370/345 |
| 4,412,285 A | * | 10/1983 | Neches et al. ............ | 709/252 |
| 5,471,623 A | * | 11/1995 | Napolitano, Jr. .......... | 709/243 |
| 5,757,767 A | * | 5/1998 | Zehavi .................... | 370/208 |
| 5,870,564 A | * | 2/1999 | Jensen et al. ............. | 709/241 |
| 5,912,753 A | * | 6/1999 | Cotter et al. .............. | 398/54 |
| 5,919,257 A | * | 7/1999 | Trostle ................... | 713/200 |
| 6,026,444 A | * | 2/2000 | Quattromani et al. ...... | 709/232 |
| 6,067,620 A | * | 5/2000 | Holden et al. ............ | 713/155 |
| 6,160,651 A | * | 12/2000 | Chang et al. ............. | 398/79 |
| 6,219,161 B1 | * | 4/2001 | Chang et al. ............. | 398/79 |
| 6,343,362 B1 | * | 1/2002 | Ptacek et al. ............. | 713/201 |
| 6,757,497 B1 | * | 6/2004 | Chang et al. ............. | 398/51 |

OTHER PUBLICATIONS

Ortalo, R. Experimenting with Quantitative Evaluation Tools for Monitoring Operational Security 08151998 pp. 633-650.*

Clarkson Approximation Algorithms for Shortest Path Motion Planning 1987. ACM. p. 56-65.*

L. P. Swiler and C. Phillips, "A Graph-Based System for Network-Vulnerability Analysis", A paper presented at the New Security Paradigms Workshop '98, Charlottesville, VA, Sep. 22-25, 1998.

L. P. Swiler, C. Phillips, T. Gaylor, "Risk-Based Characterization of Network Vulnerability", A Conference Presentation at Society for Risk Analysis Annual Meeting in Washington, DC, Dec. 7-10, 1997.

(Continued)

*Primary Examiner*—Kambiz Zand
(74) *Attorney, Agent, or Firm*—Russell D. Elliot

(57) ABSTRACT

A computer system analysis tool and method that will allow for qualitative and quantitative assessment of security attributes and vulnerabilities in systems including computer networks. The invention is based on generation of attack graphs wherein each node represents a possible attack state and each edge represents a change in state caused by a single action taken by an attacker or unwitting assistant. Edges are weighted using metrics such as attacker effort, likelihood of attack success, or time to succeed. Generation of an attack graph is accomplished by matching information about attack requirements (specified in "attack templates") to information about computer system configuration (contained in a configuration file that can be updated to reflect system changes occurring during the course of an attack) and assumed attacker capabilities (reflected in "attacker profiles"). High risk attack paths, which correspond to those considered suited to application of attack countermeasures given limited resources for applying countermeasures, are identified by finding "epsilon optimal paths."

24 Claims, 2 Drawing Sheets

OTHER PUBLICATIONS

L. P. Swiler, C. Phillips, T. Gaylor, "*A Graph-Based Network-Vulnerability Analysis System*", A Conference Paper presented at the 1998 IEEE Symposium on Security and Privacy in Oakland, CA, May 3-6, 1998.

M. Dacier, Y. Deswarte, M. Kaaniche, "*Quantitative Assessment of Operational Security: Models and Tools*", LAAS Research Report 96493, May 1996.

S. F. Bush, "*Network Vulnerability Analysis Tool Precis*", Bush: Information Warfare Strategy and Control Analysis, Mar. 29, 1999, Draft.

L. P. Swiler, C. Phillips, T. Gasylor, "*A Graph-Based Network-Vulnerability Analysis System*" Sandia National Laboratories Sandia Report SAND97-3010/1, Jan. 1998.

R. T. Marsh, Chairman, "*Critical Foundations, Protecting America's Infrastructures*", The Report of the President's Commission on Critical Infrastructure Protection, Oct. 1997.

R. Ortalo, Y. Deswarte, and M. Kaaniche, "*Experimenting with Quantitative Evaluation Tools for Monitoring Operational Security*", IEEE Transcations on Software Engineering, vol. 25, No. 5, Sep./Oct. 1999.

B. V. Cherkassky, A. V. Goldberg, T. Radzik, "*Shortest Paths Algorithms: Theory and Experimental Evaluation,*" Aug. 3, 1993.

D. Naor and Douglas Brutlag, "*On Suboptimal Alignments of Biological Sequences.*" No Date.

* cited by examiner

METHOD AND TOOL FOR NETWORK VULNERABILITY ANALYSIS

This invention was made with Government support under Contract DE-AC04-94AL85000 awarded by the U.S. Department of Energy. The Government has certain rights in the invention.

BACKGROUND OF THE INVENTION

1. Field of the Invention

This invention relates to the field of countermeasures against attacks on computer systems, and more particularly to a rigorous analysis method and computer software tool designed to identify which parts of a computer network are most vulnerable to attack by an adversary. Specifically, according to the invention, an attack graph is generated based on hypothesized capabilities of an adversary, network configuration information, and knowledge of the requirements for a successful attack. An attack graph generated in this fashion is then analyzed to determine high-risk attack paths and to provide insight into how to reduce network vulnerability.

2. Description of the Related Art

Military, government, commercial, and civilian operations all depend upon the security and availability of computer systems and networks. Over the past decade, people have become more aware of the need for information security as intrusions, attacks, and viruses have become more frequent and widespread. According to the Commission Report of the Presidential Commission of Critical Infrastructure Protection, "Critical Foundations: Protecting America's Infrastructures" (October 1997), industry and government are vulnerable to attack through their reliance on information technologies. Academia and computer companies have responded to the security problem by developing hardware (e.g. firewalls) and software (e.g. scanning tools) to identify threats and vulnerabilities and protect information assets. The current approach to information assurance, however, is often driven by checklists and compliance standards, and not by an overall understanding of system requirements and the components chosen to implement those requirements within a required risk level. Further, current methods do not trace causality throughout a system.

Quantifying security risks in computer networks is very difficult. Ideally, a network-vulnerability risk-analysis system should be able to model the dynamic aspects of the network (e.g., virtual topology changing), multiple levels of attacker ability, multiple simultaneous events or multiple attacks, user access controls, and time-dependent, ordered sequences of attacks. A tool that quantitatively identifies vulnerable paths and nodes in a networked environment would be useful both in the design and assessment of information systems.

In assessing the problem of network vulnerabilities various approaches have been tried in the past. Probabilistic Risk Assessment (PRA) techniques such as fault-tree and event-tree analysis provide systematic methods for examining how individual faults can either propagate into or be exploited to cause unwanted effects on systems. These methods, however; have limited effectiveness in the analysis of computer networks because they cannot model multiple attacker attempts, time dependencies, or access controls. In addition, fault trees don't model cycles (such as an attacker starting at one machine, hopping to two others, returning to the original host, and starting in another direction at a higher privilege level). Methods such as influence diagrams and event trees suffer from the same limitations as fault trees.

Computer security/risk analysis tools have been developed that perform the function of scanning to check for the presence of previously identified services or conditions known to result in network vulnerability. Such tools, however, do not consider the physical network topology in conjunction with set of attacks. A seminal tool, SATAN (Security Administrator Tool for Analyzing Networks) created by D. Farmer and W. Venema. Lawrence Livermore National Laboratory maintains an Internet site on the World Wide Web (http://ciac.llnl.gov/ciac/ToolsUnixNetSec.html#Satan) from which, at the time the present application for patent is made, information can be obtained regarding this tool. SATAN checks a "laundry list" of services or conditions that are enabled on a particular machine. For example, on UNIX systems SATAN checks for NFS file systems exported to unprivileged programs or arbitrary hosts, but gives little indication of how these items lead to system compromise. More recent scanners such as the Internet Scanner™ from Internet Security Systems, Inc. (ISS) probe the network and provide information about potential vulnerabilities that could be exploited. (ISS is located at 41 Perimeter Center East, Suite 550, Atlanta, Ga. 30346, and as of the time this application is being prepared, information about Internet Scanner™ is available via the Internet at http://www.iss.net/xforce). These scanning tools can provide a system administrator with a set of items to patch or fix. However, these scanners do not verify that all conditions for a complete attack are met, nor do they identify linked attacks potentially more harmful than individual attacks. Though they can suggest fixes for local potential problems, they don't consider the network as a whole, proposing a global set of cost-effective defenses designed to protect the network's most critical resources.

Using a different approach, Dacier, et al. propose using a "privilege graph" to represent complex attacks with a single edge. (Dacier, M., Y. Deswarte, and M. Kaaniche. "Quantitative Assessment of Operational Security: Models and Tools." LAAS Research Report 96493, May 1996). Although Dacier, et al. use a graph to assist in network vulnerability analysis, the function of the graph is distinguishable from the attack graphs of the present invention to be described below. The privilege graph does not explicitly represent attacker capabilities and is based mainly on the acquisition of "privileges" of the user (e.g., the ability to read, write, and modify certain files). On the other hand, the attack graph of the present invention encapsulates a much richer definition of "state" of a node including changes made by the attacker to the configuration, capabilities acquired by the attacker at various stages of an attack and other factors. Dacier, et al. transform the privilege graph into a Markov model and determine the estimated mean time and effort to target by enumerating all searches in the privilege graph. The Markov model represents all possible probing sequences of a non-omniscient attacker. Ortalo et al. present experimental results using this model, based on a privilege graph constructed from 13 major UNIX vulnerabilities. They conclude that Mean Effort to Failure (METF) is more valuable as a security metric than the single shortest path or raw number of paths to target. However, they were not always able to compute METF, even for fairly small graphs. (See: "Experimenting with Quantitative Evaluation Tools for Monitoring Operational Security," by R. Ortalo, Y. Deswarte, and M. Kaaniche in IEEE Transactions on Software Engineering, Vol. 25, No. 5, September/October 1999).

It is against this background that the present invention was made. A need exists for a system that does identify high-risk attack paths and linked sequences of attack steps in an attack graph. There also remains a need for a system that is user friendly and has an instructive interface that identifies critical paths.

SUMMARY OF THE INVENTION

An object of the present invention is to provide a graph-based approach to network vulnerability analysis that is flexible, allows analysis of attacks from both outside and inside the network, and can analyze risks to a specific network asset, or examine the universe of possible consequences following a successful attack.

Another object of the invention is to provide a graph-based tool that can identify the set of attack paths that have a high probability of success (or a low "effort" cost) for the attacker.

Yet another object is to provide a system and method to test the effectiveness of making configuration changes or otherwise altering a network system to counter system vulnerabilities by, for example, implementing an intrusion detection system.

Yet another object of the invention is to provide method for systematically identifying and mitigating vulnerabilities in a computer system including the steps of describing a set of potential attacks on the computer system, defining a path for each potential attack described, and for each path, assigning a length value, L, corresponding to degree of attacker effort necessary to effect the transition from the start condition to the attack goal.

Yet another object of the invention is to identify, from within the set of paths, specific paths (denoted "epsilon-optimal paths") having a length, $L \leq (1+\epsilon)$ times the length of any shortest path, where $\epsilon$ is any non-negative number. Epsilon must be large enough to account for uncertainty in individual edge metrics and uncertainty in the actual path the attacker will choose. For example, if edge weights can be wrong by a factor of 2 on average, than epsilon should be at least one so that the epsilon-optimal paths are all of those within $(1+\epsilon=1+1=2)$ times the length of a shortest path. The epsilon-optimal paths represent the set of paths that the attacker might realistically consider: an attacker will not necessarily choose "the" shortest path for reasons of incomplete knowledge about a network, personal preferences for using certain attacks or toolkits, etc. However, it is likely that an attacker would choose a path in the epsilonoptimal set. Thus, the invention designates the set of "epsilon-optimal paths" as high-risk attack paths.

Yet another object of the invention is to provide a computer system analysis tool comprising at least one configuration file from which is obtained the information about topology of a computer system, at least one attack template comprising hypothesized attack information which, in turn, comprises at least one attack step which, if successful, could effect a change in status of the computer system given its configuration, and at least one attacker profile comprising hypothesized attacker information which, in turn, may comprise at least one capability of at least one hypothesized attacker, which, if exercised, could enable said at least one attack step to take place successfully. (It is noted that the invention incorporates the possibility of using an "empty" attacker profile, if desired, for any given attack. In this case, a "default" attacker is implied.)

These and other objects of the invention are satisfied by the invention method and analysis tool that uses as input a database of common attacks broken into atomic steps, specific network configuration and topology information, and an attacker profile. The attack information is "matched" with the network configuration information and an attacker profile to create an attack graph. Nodes identify specific network states while arcs in the attack graph represent attacks or stages of attacks. By assigning probabilities of success on the arcs or costs representing level-of-effort for the attacker, various graph algorithms such as shortest-path algorithms can identify the attack paths with the highest probability of success or lowest cost, respectively.

Other objects, advantages and novel features will become apparent to those skilled in the art upon examination of the following description or may be learned by practice of the invention. The objects and advantages of the invention may be realized and attained by means of the instrumentalities and combinations particularly pointed out in the appended claims.

DESCRIPTION OF THE FIGURES

The accompanying drawings, which are incorporated into and form part of the specification, illustrate embodiments of the invention and, together with the description, serve to explain the principles of the invention.

DETAILED DESCRIPTION OF THE INVENTION

Figure 1:
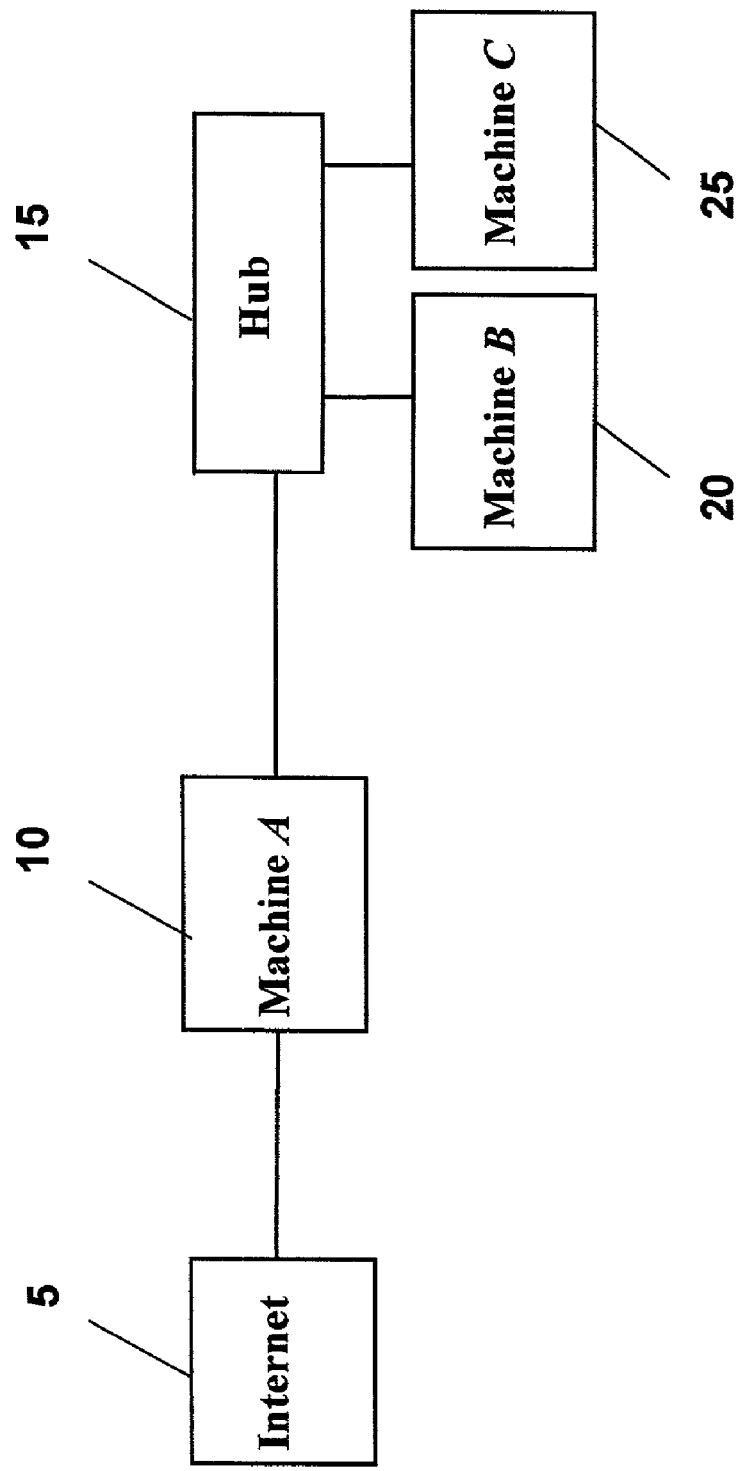
FIG. 1 depicts an example network configuration.

The inventive approach to modeling network risks is based on an attack graph. Each node in the graph represents a possible attack state. A node contains information about the physical machine(s) the attacker has accessed, the user privilege level the attacker has gained, and effects of the attack so far, such as placement of trojan horses or modification of access control. Edges represent a change of state caused by a single action taken by the attacker (including normal user transitions if they have gained access to a normal user's account) or actions taken by an unwitting assistant (such as the execution of a trojan horse).

The attack graph is automatically generated given three types of input: attack templates, a configuration file, and an attacker profile. Attack templates represent a generic attack step including necessary and acquired security attributes (e.g., attacker capabilities and/or system vulnerabilities). The configuration file contains initial architectural information about the specific system to be analyzed including the topology of the networks and detailed configurations of particular network elements such as workstations, servers, or routers. The configuration files include categorical labels for all known exploitable configurations (e.g. blank administrator password) and are used as triggers for state changes. The attacker profile contains categorical information about the assumed attacker's capabilities used for matching to the templates (e.g., the possession of an automated toolkit or a sniffer). The attack graph is a customization of the generic attack templates to the attacker profile and the network specified in the configuration file. Though attack templates represent pieces of known attack paths or hypothesized methods of moving from one state to another, their combinations can lead to descriptions of new attack paths. That is, any path in the attack graph represents an attack, though it could be constructed from many smaller attack steps.

A template consists of the conditions necessary for a state transition, the edge weight (an additive, quantitative metric being evaluated), and the additional capabilities and new exploitable configurations present after a successful transition. The template contains all of the matching conditions to trigger the template-defined state change. When a node in the graph matches the requirements of the template and the template application satisfies non-redundancy requirements, the edge transition is triggered, and a new edge is created pointing to a new or existing node in the attack graph that represents the additional capabilities specified in the template.

Each edge has a weight representing a system-security metric, such as success probability, average time to implement, or a cost/effort level for an attacker. This weight could be a function of configuration and attacker profile. A short path in the attack graph represents a low cost path. Since edge weights may only be estimates, we consider the set of all $\epsilon$-optimal paths (defined as all paths that have a path length at most $(1+\epsilon)$ times the shortest path length.) If the edge metrics are reasonably accurate, this set as a group represents the most exploitable parts of the network with respect to this metric. By having multiple metrics on each edge, one can represent conflicting criteria (e.g. the attacker wishes to maximize probability of success subject to a limit on time spent). The set of $\epsilon$-optimal shortest paths provides a useful measure of overall system security. The nodes and edges of the attack graph that appear most frequently in the set of $\epsilon$-optimal paths are identified as critical nodes and edges, and can be used in subsequent analysis to suggest defense placement.

This system can answer "what-if" questions regarding security effects of configuration changes such as topology changes or installation of intrusion-detection systems. It can indicate which attacks are possible only from highly skilled attackers, and which can be achieved with lower levels of effort. A business owner might decide it is acceptable to allow a relatively high probability of network penetration by a "national-scale" effort, but will tolerate only a small probability of attack from an "average" attacker. Government sites, which are attacked with much higher frequency, may need an exceptionally low probability of success for knowledgeable attackers to expect few penetrations, and they may be more willing to pay the cost for that level of security. Finally, this system will be complementary to an intrusion detection system. If an administrator does not want to pay the full cost (development cost or decrease in system performance) associated with all possible intrusion-detection strategies, the system of the present invention could be used to suggest cost-effective subsets which focus on the most vulnerable system components. It can also be used to indicate the most vulnerable pieces of a system, given that the attacker has already penetrated to a certain level, as indicated by an intrusion-detection system. That is, one can run a forward/exploratory graph generation from a start point that indicates the current level of system exploitation.

A prototype tool has been developed and used to demonstrate successful application of the principles of the present invention. To gather information about network configuration and topology, Perl scripts (which are run as root) have been used to poll machines and gather data such as IP address, machine type, operating system, users, file system structure, etc. The network information is stored in configuration files. We have created a library of attack templates. Templates list the required conditions for state transitions. Data structures have been designed for the attack templates, the configuration information, the attacker profile, and the attack graph using C++, with an emphasis on representations that give maximal efficiency, since there may be thousands of "matching" operations at each step in the generation of the attack graph.

The graph generator is a C++ program that creates the attack graph and populates the edges with edge weights, representing a security metric of interest. The graph is generated by matching the information known about the current state against the library of templates, choosing only the templates that apply to the current state. Each path in the graph represents a unique attack path. A path is a sequence of potential attack steps based on network configuration and attack requirements. The network configuration is "overwritten" as the graph is generated, representing new vulnerabilities or configuration changes caused by attacker actions. An analysis program calculates a canonical representation of all $\epsilon$-optimal paths (i.e. those with length at most $(1+\epsilon)$ times the length of the shortest path). From this representation, we can output a subset of the possibly exponentially many $\epsilon$-optimal paths, and we can count how many such paths pass through each edge or node. Any of a variety of shortest-path algorithms can be used successfully in the context of the present invention. An example of a functional algorithm is described in Cherkassky, B. V., A. V. Goldberg, and T. Radzik, "Shortest Paths Algorithms: Theory and Experimental Evaluation," *Math Programming*, 73, pp. 129–174, 1996. The $\epsilon$-optimal algorithm used in the prototype tool is based on Naor, D. and D. Brutlag, "On suboptimal alignment of biological sequences," *Proceedings of the 4th annual Symposium on Combinatorial Pattern Matching*, Springer Verlag, 1993, pp. 179–196.

EXAMPLE

The following is a description of a working prototype tool. In the embodiment of the prototype tool, the graph-generation program is linked to a user interface developed in Tcl/Tk. The user interface allows the user to specify basic parameters for the graph generation, run the graph generator, analyze the graph, and view the output. The attack graph is drawn and displayed with a program called dot, which is public-release software developed by AT&T Research for drawing general graphs. Other graph drawing programs can be substituted for dot without departing from the principles of the claimed invention. Those skilled in the applicable art will be capable of selecting suitable programs for this purpose.

The tool comprises several different modules. In this example, as previously outlined with regard to the invention, generally, attack templates include a listing of requirements on one or more machines and a list of vulnerabilities and capabilities that are added or deleted from the system state when the template is instantiated. In this example, the tool represents two machines in a template: a source and a destination. The destination is the machine where vulnerabilities are added. The source, which may differ from the destination or be the same machine, supports the attack.

When the requirements of a template are satisfied by a state in the attack graph and the template application satisfies non-redundancy constraints, an edge is added to the attack graph as well as a subsequent node that is the head of the edge (if that node is not already in the graph). This node contains the extra vulnerabilities and capabilities gained as the result of the edge transition. The requirements are of two types: "bit" requirements which are represented by a (0/1) indicating if a certain vulnerability or attribute is present or not, and "ranked" requirements which select a particular range from an ordered set of values for a "ranked" vulnerability. For example, if the set of user classes is defined as {none, guest, normal, system administrator, root}, a requirement that {user level <=normal} includes the classes {none, guest, normal}. Bit and/or ranked requirements can be combined using arbitrary logical operators such as AND, OR, or NOT. For example, requirement 1 and (requirement 2 or 3) must hold for this template to fire.

The attack template also contains an edge weight. When the template is instantiated, it returns a value that is the weight on the edge in the attack graph. The value may represent time for the attack to succeed, cost to the attacker, etc., depending on which metric the user chooses.

A library of attack templates exists. Each template can be categorized according to operating system type, user privilege level required, and so forth, so that a variety of different types of attacks to a given system can be modeled and analyzed.

The configuration file generally consists of a list of elements on the network and relevant information about those elements, such as hardware type, operating system version, vulnerabilities present, processes running, etc. To generate the configuration file, it is possible to use a commercially available scanning tool, configuration management tools, and/or custom scripts. Perl scripts, which run as root, for example can be used to search network elements for information such as processes and utilities running, and vulnerabilities present. The labels used in the configuration file to describe the attributes of a network element are the same as those used in the templates so that proper matching can occur in the graph generation stage.

Configuration files can leave configuration information "unknown". The graph generator resolves unknown values with a two-level default system. Each attribute has a default value. For example, the access control default may be read and write. Whenever the graph generator encounters an unknown value in the configuration or attacker profile, it uses the default value for the attribute it is testing. An attribute default can also be "unknown". In this case, the test falls through to a global yes/no default. This default determines the outcome of the test rather than the value of the attribute match and is therefore suitable for both individual attributes and classification properties.

The attacker profile generally consists of a list of information about the assumed attacker's capabilities used for matching to the templates (e.g., the possession of an automated toolkit or a sniffer). As noted previously, an "empty" attacker profile can also be used wherein a default attacker is implied. The labels used in the attacker profile are the same as those used in the templates so that proper matching can occur in the graph generation stage.

The graph generator generally consists of algorithms that take as input a start and/or end node for the graph and generate it. The main function of these algorithms is to examine the list of nodes currently in the attack graph, check if the nodes in the attack graph satisfy any of the templates, and process the addition of nodes to the graph correctly. If all of the requirements for a particular template are satisfied, a new edge and possibly a new node are added to the graph, representing the new vulnerabilities that are introduced when that edge transition occurs. In the prototype, all templates are applied to the start node, and new nodes are placed into a queue unless they have been specified as goal/stop nodes. Each node is removed from the queue in turn and all relevant templates are applied. The process terminates when no unprocessed nodes remain in the queue.

Once the graph is generated, it can be displayed graphically with a variety of computer programs that are available for drawing graphs given the list of nodes and edges in the graph. It is considered that the graph drawing program used is a matter of choice, and that those skilled in the art of graphical presentation of data will be capable of selecting a particular graph drawing routine that is suited to their needs.

A node in the attack graph represents an attack "state." A state is defined as a list of vulnerabilities (bit or ranked vulnerabilities) and capabilities achieved on each machine. More explicitly, a state is a list of overwrites to the initial configuration file, all of which apply. An overwrite has a list of machines and a list of configuration changes. All of the configuration changes apply to any one of the machines on the list. An example of a state is ((Vulnerabilities 3 and 4 on Machines 1 or 2) and (Vulnerability 7 on machine 5)). In this example, the first overwrite adds two vulnerabilities to either Machine 1 or 2, and the second overwrite adds an extra vulnerability to machine 5. The node data structure contains a list of overwrites, a list of incoming and outgoing edges, and fields that contain information about the shortest path(s). In the graph generator, we keep the initial configuration as a baseline, and store only deviations from the initial configuration and/or attacker information in each node to represent the changes as tersely as possible. We do not attempt to simplify overwrites by redundantly representing vulnerabilities already in the configuration. This avoids any confusion regarding which vulnerabilities are added by attacker action, and it also facilitates implementation. In the example given above, in the initial configuration neither Machines 1 or 2 have Vulnerability 3 or Vulnerability 4, and Machine 5 does not have Vulnerability 7. The new state derived from the application of an attack template may narrow the flexibility of the original state. For example, to meet destination requirements, two vulnerabilities may be needed on the same machine (rather than two different machines) and the set of possible machines for a particular vulnerability could be narrowed to exclude those that do not meet all the template requirements. The attack graph should have no directed cycles, since it is never to an attacker's advantage to perform steps that simply return to a state he has already achieved. Cycle-causing edges can be eliminated before adding them to the graph, and though the test is straightforward and theoretically efficient, this may take a substantial amount of time in practice. Instead, for the prototype tool we have suppressed matching on all templates that add only vulnerabilities already implied by the current node's state.

In the graph generator, it is necessary to identify the best way to generate nodes with multiple, independent vulnerabilities. One approach to this is by enforcing an ordering. If one needs both vulnerabilities A and B for an attack and having one gives no advantage in acquiring the other, the system will generate an attack path where the attacker acquires A first and then B. This is not the same as acquiring B and then A. In the interests of calculation efficiency and economy, the system should not and cannot generate all n! paths to a node with n vulnerabilities. Thus, for the cases where ordering does not matter, we simply pick one ordering and eliminate the other redundant paths which are different combinations of the same vulnerabilities. We enforce this partial order by giving each vulnerability a rank. A vulnerability precedes another (and must be acquired first) if it has a lower rank. Two vulnerabilities with the same rank are incomparable, and therefore we generate both orders. We compute the ranks as follows. Suppose vulnerability j is an ancestor of k. That is, vulnerability j can satisfy a requirement in a template that adds vulnerability k. The partial order must respect this ancestor relationship (it must be possible for a path to acquire vulnerability j before vulnerability k). We create an ancestor graph that has a node for each vulnerability and an edge from node j to node k if vulnerability j is an ancestor of vulnerability k. Nodes in the same strongly connected component share a cycle (each can be used to get the others) and therefore all have the same rank. We collapse these components to single nodes, compute a topological sort of the resulting acyclic graph, and give each node its rank in this topological sort (where nodes in collapsed strongly-connected components inherit the component's rank). We can compute the strongly-connected components and topological sorts in linear time (Cormen, T. H, C. E. Leiserson, and R. L. Rivest, *Introduction to Algorithms*, MIT Press/McGraw-Hill, 1990).

Once the attack graph is generated, it is run through the ϵ-optimal shortest path algorithm described above to determine a representation of all of the paths with length less than or equal to (1+ϵ) times the shortest path length. The output of these calculations is then displayed to the user through the graphical user interface.

An example network configuration is shown in FIG. 1, and an attack graph for such a configuration, generated using the prototype tool mentioned above, is shown in FIG. 2. The attack modeled for the example network of FIG. 1 shows an attacker coming in from a machine on the Internet 5, getting through the mail server, herein designated Machine A 10, and eventually gaining access via a hub 15 to two separate machines, herein designated Machine B 20 and Machine C 25. In this example, the attacker on the Internet 5 uses a vulnerability associated with INND to get a one-time command execution on Machine A 10. Then, the attacker uses one of the suid command subversions to get root on the Machine A 10. From that point, he or she can install a sniffer and sniff the password of a person going from Machine B 20 to Machine C 25. Upon gaining a plain text password of a user on Machine B or Machine C, the attacker can become a normal user on Machines B or C. From there, the user can use the rpc.ttdbserverd daemon to gain root on these machines. Alternatively, the attacker uses the rpc.ttdbserverd daemon directly from root on Machine A to become root on Machine B or Machine C. The templates used in this example include the INND vulnerability, the suid commands, the rpc.ttdbserverd daemon, sniffer installation, etc.

Figure 2:
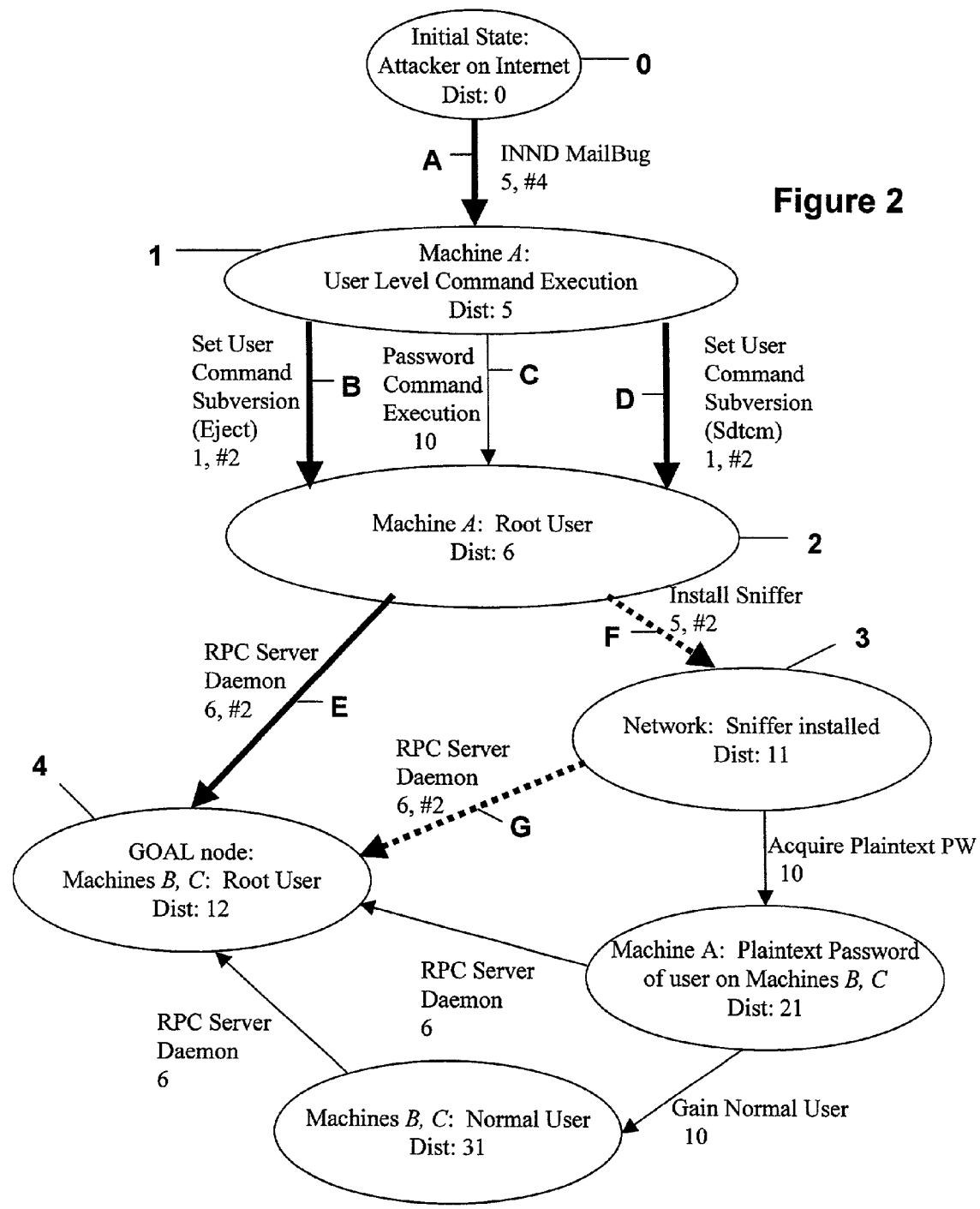
FIG. 2 is an example attack graph.

FIG. 2 depicts an attack graph generated based on the present example. Nodes are depicted as ovals, and arrows in the Figure represent edges. As discussed in more detail below, characteristic information associated with particular nodes is shown inside the ovals, and characteristic information associated with particular edges is shown alongside the corresponding arrows. For convenience in identifying shortest paths, the Figure includes number reference characters and lead lines designating certain of the nodes, and letter reference characters and lead lines designating certain of the edges. The start node 0 is shown at the top of FIG. 2. The stop node (or goal node) 4 is shown in the lower left-hand portion of FIG. 2.

Each node in the graph contains information about what user privileges the attacker has obtained, extra vulnerabilities not implied by privilege level, and the shortest distance from the start to the current node (displayed, for purposes of this illustration, in the Dist: field). Distance, in this case, relates to the edge weight functions in the attack templates and represents, as more fully explained above, such considerations as estimated time, cost, degree of effort and likelihood of detection of the attack.

Similarly, the attack graph in the Figure shows information about the events marking transitions between nodes or attack states. The labels associated with the edges indicate what template has fired to make that edge transition. The first number below the edge label indicates the edge weight for that transition, and the number following the # sign is the number of near-optimal shortest paths that pass through this edge (a high value indicates a critical edge).

In the illustrated example, referring to attack state in node 0, information is shown indicating that in this initial state, the attacker is on the Internet, but has not yet gained access to Machine A. The information associated with that node shows that no heightened privileges (over the Internet access originally possessed by the attacker) have been obtained at that stage of the attack. The transition from node 0 to node 1 is shown by edge A. The attacker uses an INND Mailbug to gain access to Machine A. The edge weight assigned to this transition is 5 edge weight units, and the number of near-optimal shortest paths passing through edge A is four. (This is the highest value in the graph for near-optimal shortest paths, so therefore, this is the most critical edge in the attack graph.) As a result of the attacker's actions reflected in edge A, the attacker gains access to Machine A. An added vulnerability, user level command execution, is likewise shown in the graph in node 1. That vulnerability can be exploited by the attacker in three different ways, shown in edges B, C, and D, with varying degrees of difficulty or likelihood of success, etc., as reflected in the specific edge weights associated with those edges. Ultimately, any of template attacks shown in edges B, C, or D could allow the attacker to acquire privileges as a root user on Machine A (as shown in node 2), but not, for example, at equal cost to the attacker or likelihood of success. Since the shortest distance from the start node 0 to node 2 is through edge A (with edge weight 5) and edge B or D (both with edge weight 1), the distance recorded in node 2 is 6. Node C (with edge weight 10) does not represent a shortest path.

In the figure, the shortest distance from the start node 0 to the stop node 4 (where the attacker acquires root user priveleges on Machine B and C) is 12 units. There are two shortest paths, outlined in bold arrows, both having the same path length. For this run, applying the invention principle of epsilon optimal paths, the analysis counts all paths within 1.5 times optimal (i.e. all paths with length at most 18). The paths indicated by the dotted lines are the epsilon optimal paths for this example.

It is intended that the scope of the invention be defined by the claims appended hereto. Although the invention has been described in detail with particular reference to preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

We claim:

1. A computer-implemented method for systematically identifying and characterizing vulnerabilities in a computer system comprising the steps of:

describing a set of potential attacks on the computer system through which a change in status of the computer system could be effected, wherein the change comprises a transition from a start condition to an end condition which is different from the start condition;

defining a set of paths comprising at least one path for each potential attack described, wherein each path comprises at least one event necessary for transition from the start condition to the end condition, which transition can include passage through intermediate conditions in transit from the start condition to the end condition;

for each path in said set of paths, assigning a length value, L, corresponding to a metric reflecting at least one security significant condition bearing on likelihood of success of an attacker attempting to effect said transition from the start condition, through intermediate conditions, if any, to the end condition, so that the value of L correlates inversely with said likelihood of success;

identifying within said set of paths at least one shortest path defined as that having the smallest length value of paths in the set of paths;

identifying, from within the set of paths, specific paths (denoted "epsilon optimal paths") having a length, $L \leq (1+\epsilon)$ times the length of the shortest path, where $\epsilon$ is a non-negative number that accounts for uncertainty in individual edge metrics and uncertainty in the actual path the attacker will choose; and designating "epsilon optimal paths" as high risk attack paths.

2. The method of claim 1 wherein the at least one security significant condition is selected from the group consisting of estimated time necessary for the attacker to achieve said success, estimated cost to the attacker in order to achieve said success, estimated degree of effort by the attacker in order to achieve said success, estimated likelihood of detection of the attacker's efforts in attempting to achieve said success, estimated likelihood of approbation of an attack, and any combination thereof.

3. The method of claim 2 further comprising the step of generating a graphical depiction of at least a portion of the set of paths, wherein, for each path, nodes represent discrete physical states of the computer system and edges adjoining nodes represent transitions between physical states in the computer system.

4. The method of claim 3 wherein nodes shown in the graphical depiction include a physical state associated with the start condition, a physical state associated with the end condition, and physical states associated with intermediate conditions, if any exist for a given path.

5. The method of claim 4 wherein redundant paths to nodes are eliminated, by enforcing an ordering on acquisition of multiple, independent vulnerabilities in the graph.

6. The method of claim 5 wherein transitions between physical states in the computer system are characterized mathematically by assigning each transition an edge weight based on at least one security significant metric having an assigned value.

7. The method of claim 6 wherein the assigned value of the at least one security significant metric is calculated as a function of an element capable of affecting security of the computer system, wherein the element is selected from the group consisting of capabilities of at least one hypothesized attacker and, network configuration information.

8. The method of claim 7 wherein the capabilities of the at least one hypothesized attacker are assigned a quantitative value based on a factor selected from the group consisting of:

hypothesized probability of success of the attacker in effecting a given transition between physical states;

hypothesized cost to the attacker in effecting a given transition between physical states;

hypothesized level of effort of the attacker in effecting a given transition between physical states hypothesized length of time necessary for the attacker to succeed in effecting a given transition between physical states; and any combination thereof.

9. The method of claim 8 further comprising the steps of providing at least one configuration file from which is obtained the information about the network and machine configuration of the computer system;

providing at least one attack template comprising hypothesized attack information which, in turn, comprises at least one attack step which, if successful, could effect a change in status of the computer system given its configuration; and providing at least one attacker profile comprising hypothesized attacker information which, in turn, comprises at least one capability of at least one hypothesized attacker, which, if exercised, could enable said at least one attack step to take place successfully.

10. The method of claim 9 wherein the configuration file is generated as a result of gathering information about the network configuration by polling machines to obtain data about physical elements comprising the system.

11. The method of claim 10 wherein the physical elements comprising the system are selected from the group consisting of IP address, machine type, operating system, users, file system structure, vulnerabilities on machines, and programs running on machines.

12. An apparatus for detecting and characterizing vulnerabilities in a computer system comprising:

a) a processing unit b) a storage system connected with the processing unit c) an input device connected with the processing unit d) an output device connected with the processing unit;

e) potential attack set input means for using the input device to load a set of potential attacks into the storage system, wherein the set of potential attacks define attacks through which a change in status of the computer system could be effected, wherein the change comprises a transition from a start condition to an end condition which is different from the start condition;

f) path set definition means for defining a set of paths comprising at least one path for each attack in the set of potential attacks, wherein each path comprises at least one event necessary for transition from the start condition to the end condition, which transition can include passage through intermediate conditions in transit from the start condition to the end condition;

g) length value assigning means for assigning, for each path in the set of paths, a length value, L, corresponding to a metric reflecting at least one security significant condition bearing on likelihood of success of an attacker attempting to effect said transition from the start condition, through intermediate conditions, if any, to the end condition, so that the value of L correlates inversely with said likelihood of success;

h) shortest path identification means for identifying within said set of paths at least one shortest path defined as that having the smallest length value of paths in the set of paths;

i) epsilon optimal path identification means for identifying, from within the set of paths, specific paths (denoted "epsilon optimal paths") having a length, $L \leq (1+\epsilon)$ times the length of the shortest path, where $\epsilon$ is a non-negative number that accounts for uncertainty in individual edge metrics and uncertainty in the actual path the attacker will choose; and j) output means for using the output device to communicate "epsilon optimal paths" to a user.

13. The apparatus of claim 12 wherein the at least one security significant condition is selected from the group consisting of
estimated time necessary for the attacker to achieve said success,
estimated cost to the attacker in order to achieve said success,
estimated degree of effort by the attacker in order to achieve said success,
estimated likelihood of detection of the attacker's efforts in attempting to achieve said success,
estimated likelihood of approbation of an attack, and
any combination thereof.

14. The apparatus of claim 13 further comprising graphical depiction generating means for generating a graphical depiction of at least a portion of the set of paths, wherein, for each path, nodes represent discrete physical states of the computer system and edges adjoining nodes represent transitions between physical states in the computer system.

15. The apparatus of claim 14 wherein nodes shown in the graphical depiction include
a physical state associated with the start condition,
a physical state associated with the end condition, and physical states associated with intermediate conditions, if any exist for a given path.

16. The apparatus of claim 15 wherein redundant paths to nodes are eliminated, by enforcing an ordering on acquisition of multiple, independent vulnerabilities in the graph.

17. The apparatus of claim 16 wherein transitions between physical states in the computer system are characterized mathematically by assigning each transition an edge weight based on at least one security significant metric having an assigned value.

18. The apparatus of claim 17 wherein the assigned value of the at least one security significant metric is calculated as a function of an element capable of affecting security of the computer system, wherein the element is selected from the group consisting of
capabilities of at least one hypothesized attacker and,
network configuration information.

19. The apparatus of claim 18 wherein the capabilities of the at least one hypothesized attacker are assigned a quantitative value based on a factor selected from the group consisting of:
hypothesized probability of success of the attacker in effecting a given transition between physical states;
hypothesized cost to the attacker in effecting a given transition between physical states;
hypothesized level of effort of the attacker in effecting a given transition between physical states
hypothesized length of time necessary for the attacker to succeed in effecting a given transition between physical states; and
any combination thereof.

20. The apparatus of claim 19 further comprising configuration file input means for using the input device to load at least one configuration file from which is obtained the information about the network and machine configuration of the computer system.

21. The apparatus of claim 20 further comprising attack template input means for using the input device to load at least one attack template comprising hypothesized attack information which, in turn, comprises at least one attack step which, if successful, could effect a change in status of the computer system given its configuration.

22. The apparatus of claim 21 further comprising attacker profile input means for using the input device to load at least one attacker profile comprising hypothesized attacker information which, in turn, comprises at least one capability of at least one hypothesized attacker, which, if exercised, could enable said at least one attack step to take place successfully.

23. The apparatus of claim 19 wherein the configuration file is generated as a result of gathering information about the network configuration by polling machines to obtain data about physical elements comprising the system.

24. The apparatus of claim 23 wherein the physical elements comprising the system are selected from the group consisting of IP address, machine type, operating system, users, file system structure, vulnerabilities on machines, and programs running on machines.

* * * * *

UNITED STATES PATENT AND TRADEMARK OFFICE
CERTIFICATE OF CORRECTION

| | | |
|---|---|---|
| PATENT NO. | : 7,013,395 B1 | Page 1 of 1 |
| APPLICATION NO. | : 09/805640 | |
| DATED | : March 14, 2006 | |
| INVENTOR(S) | : Laura Painton Swiler and Cynthia A. Phillips | |

It is certified that error appears in the above-identified patent and that said Letters Patent is hereby corrected as shown below:

Title page,
Item [73], Assignee, should read as follows:
-- Sandia Corporation, Albuquerque, NM (US) --.
Item [74], *Attorney, Agent, or Firm*, should read -- Russell D. Elliott --.

Column 2,
Lines 8-10, "A seminal tool, SATAN" should read -- A seminal tool was SATAN --.

Column 3,
Line 48, "epsilonoptimal" should read -- epsilon-optimal --.

Column 10,
Line 34, "Node C" should read -- Edge C --.

Signed and Sealed this

Twentieth Day of June, 2006

JON W. DUDAS
*Director of the United States Patent and Trademark Office*